United States Patent Office 2,981,760
Patented Apr. 25, 1961

2,981,760

METHOD OF STABILIZING TRICHLOROETHYLENE AND STABILIZING COMPOSITION THEREFOR

Antonio Ferri and Germano Patron, Milan, Italy, assignors to Sicedison S.p.A., Milan, Italy No Drawing. Filed Nov. 10, 1958, Ser. No. 772,667

Claims priority, application Italy Nov. 15, 1957

13 Claims. (Cl. 260—652.5)

This invention relates to a method of stabilizing trichloroethylene and to a stabilizing composition thereof.

It is an object of our invention to provide a novel, improved method and composition for stabilizing trichloroethylene which is particularly suited for preventing or inhibiting the decomposition of this substance which takes place in particular when trichloroethylene is used in degreasing metals, which decomposition is prevented or inhibiting by suppressing the formation of free hydrochloric acid or neutralizing the latter when formed in trichloroethylene.

It is well known in the art that trichloroethylene is an unstable chemical compound which may become rather easily decomposed by the separate or joint action of moisture, air, light, and heat, which decomposition leads to the formation of such products as hydrochloric acid, phosgene, carbon monoxide, and dichloroacetyl chloride. The decomposition phenomena leading to the formation of the aforesaid undesirable products are enhanced when the trichloroethylene is in contact with metallic surfaces such as steel and aluminium, since these phenomena are of an autocatalytic nature.

While, on the one hand, contact with metallic surfaces thus enhances the decomposition of trichloroethylene, the formation of hydrochloric acid as a result of that decomposition causes, on the other hand, a chemical attack on the metal surfaces being contacted with trichloroethylene, especially when the latter is used as a degreasing solvent in either the liquid or the vapor phase or both, in processes for degreasing metallic surfaces.

The resulting chemical attack by the acid formed from trichloroethylene, on metallic surfaces, causes the formation of metallic chlorides which, in particular, if they are aluminium and/or iron chlorides, act on trichloroethylene as decomposition catalysts, thus enhancing further the decomposition of this solvent, which is noticeable by a more or less intense coloration of the same due to the formation of condensed tar products.

Various methods are known in the art for stabilizing trichloroethylene, there being employed various organic substances such as amines, imines, phenols, alcohols, ethers, esters, epoxidic and heterocyclic derivatives, saturated and unsatuarted hydrocarbons, and the like. The substances chosen in the art for stabilizing trichloroethylene are characterized by either their capability of withdrawing from trichloroethylene and decomposition products thereof as they are formed, in order to prevent a catalytic action during the decomposition of the solvent, or their capability of suppressing the degradation of trichloroethylene from the start.

In the former case, it is necessary in particular that hydrochloric acid be removed as it is formed in trichloroethylene, and for this purpose amines have been employed, since they remove the acid under formation of their hydrochlorides; the use of epoxidic derivatives has also been suggested, because the oxygen containing oxyethylene ring in the molecule is capable of reacting with hydrochloric acid under formation of chlorohydrin (3-chloro 1,2-propanodiol); in chlorohydrin, chlorine is no longer present in ionic form and therefore does not attack metals when brought in contact therewith during the degreasing process of a metal surface with trichloroethylene.

Inhibitors of the second above-mentioned type proposed in the art for stabilizing trichloroethylene are, for instance, phenols, which are capable of protecting trichloroethylene from oxidizing decomposition, since these phenols react with oxygen, being thereby converted to the corresponding quinonoid compounds.

As explained above, amines and epoxidic compounds are acting as acid acceptors and consequently maintain the trichloroethylene used as a solvent at a practically neutral or an alkaline pH value. The stabilizing action of amines is, for instance, described in Patents 1,925,602 and 2,096,735, while the stabilizing action of ethers and, in particular, of epoxides is described in Patent 2,371,645.

The stabilizing action of phenolic compounds, which differs in the manner described above from that of the amines and ethers, and particularly epoxides, is described in Patents 1,910,962; 2,008,680; 2,751,421; 2,155,723; and others.

Each class of compounds mentioned above, as known in the art of stabilizing trichloroethylene, presents certain advantages and disadvantages with regard to the scope of protection afforded in the organic solvent.

Thus amines when employed alone must generally be added to trichloroethylene solvent in large amounts if the solvent is to be considered stable for practical purposes and withstand the severest quality specifications.

However, this use of amines in large amounts is accompanied by the considerable drawback of imparting to the solvent a high degree of alkalinity which proves particularly harmful if the trichloroethylene solvent is employed for degreasing amphoteric metals such as aluminium or zinc.

Phenols, if employed alone and having certain specific molecular structures, present peculiar antioxidant properties, but, on the other hand, they impart to the solvent a light degree of acidity and, if acid is formed in the solvent for certain reasons, phenols offer no protection due to their lack of acid acceptance.

Finally, ethers, including alkylenic oxides, have only a very limited stabilizing action if they are not used in combination with other stabilizing compounds. Thus, a synergetic combination of an epoxide with an amine has been described as a stabilizer for trichloroethylene in Patent 2,797,250.

Again, the stabilizer suffers from the drawback that a safe stabilization of trichloroethylene can only be achieved if the amine is added to the solvent in large amounts exceeding 0.1% by volume, thereby causing the trichloroethylene solvent to adopt an undesirably high alkaline reaction. The above described drawbacks are avoided and the objects stated hereinbefore are obtained by the method and composition according to our invention, which is based on our discovery that a ternary mixture containing a particular amine such as for instance diisopropyl amine, a phenolic compound such as for instance isopropyl-p-hydroxyanisole, and a lower alkylenic oxide such as for instance butylene oxide or propylene oxide, is capable of a synergetic action of stabilizing trichloroethylene in a substantially neutral or only slightly alkaline medium when added to the solvent.

The synergetic stabilizing action of the aforesaid ternary mixture prevents or inhibits the decomposition and therefore the development of acidity in trichloroethylene when the latter is subjected to the separate or joint and extended action of light, air, moisture and/or heat in the presence and while in contact with metal surfaces, which decomposition normally takes place when trichloroethylene is used both in the liquid and the vapor phase during processes for degreasing of metals.

The amine component in the aforesaid ternary mixture is, for instance, diisopropyl amine, which should be contained in the mixture in such amounts that addition of the latter to trichloroethylene leads to a content of 0.5 mole of amine per ton of trichloroethylene solvent, which corresponds approximately to 0.005% by weight of the amine in the solvent.

The above-stated amount of amine may be varied somewhat depending on the purpose for which the trichloroethylene solvent is to be used; for instance, it may be decreased to 0.001%; on the other hand, if the trichloroethylene is to be used for degreasing metallic iron surfaces, a larger amount of amine up to 0.1% by weight (approximately 10 moles) may be contained in the solvent.

The phenolic compound in the ternary mixture should be present in the solvent after addition of the mixture, in amounts of from approximately 0.005 to 0.02% by weight. These amounts may be chosen somewhat smaller (down to 0.001%) or larger (up to 0.1%), depending on other adjuvants present in the solvent.

The lower alkylenic oxide, being either proylene oxide or butylene oxide, should be added to the solvent as a component of the aforesaid ternary mixture in such amounts that its content in trichloroethylene ranges from 0.2 to 0.4% by weight. Depending on special uses of the solvent and corresponding different adjuvants contained therein, the above limits may be slightly varied by adding either somewhat smaller or larger amounts (up to 1%) of the alkylenic oxide component. Such other adjuvants may be, for instance, esters, alcohols, and the like, and may be added to the trichloroethylene degreasing solvent without effecting intrinsically or substantially the synergetic effect of the ternary mixture of our invention.

The invention shall be further illustrated by a number of examples demonstrating the technical advantages achieved therewith. These examples were prepared with samples of trichloroethylene that were stabilized by various known methods, and these samples have been classified according to their stability properties as revealed on the basis of a 48-hour accelerated oxidation test as specified in U.S.A. Army-Navy—Aeronautical Specification MIL—T 7003 and Federal Specification OT—634a.

The aforesaid prescribed stabilizing test consists essentially in causing 200 milliliters (ml.) of the trichloroethylene containing different stabilizing agents to boil for 48 hours in a Pyrex flask of 500 ml. with reflux condenser and causing gaseous oxygen saturated with water to bubble through the solvent in the flask by means of a glass tube having a diameter or 3 millimeters (mm.) at a speed of 10 to 12 bubbles per minute; a ½ x 2 x 1/16 inch SAE steel strip is suspended in the vapor phase while a ¼ x ¾ x 1/16 inch SAE steel strip is introduced in the liquid phase in the flask; a 150-watt frosted light bulb, placed underneath the container, acts simultaneously a light and heat source. At the end of the test, the acidity of the trichloroethylene contained in the flask is determined.

The results of three test series are given below in Tables I, II and III. The percentages of the various adjuvants in these tables are given by weight. The pH values were determined in the aqueous extracts of trichloroethylene after the stability tests were determined, by utilizing in each case the same water: trichloroethylene ratio of 1:1.

All tests were repeated several times and the results averaged.

TEST SERIES I

This test series comprises Examples 1 through 7, of which Examples 1, 2 and 3 were carried out with individual stabilizing compounds, Examples 4, 5 and 6 with two components each of the ternary mixture according to our invention, and Example 7 with the ternary mixture itself.

The latter Example 7 was carried out by preparing a ternary mixture from 5 grams (g.) diisopropyl amine, 10 g. of isopropyl-p-hydroxyanisole, and 200 g. of butylene oxide. Approximately 0.65 g. of the ternary mixture were then added to about 200 ml. of trichloroethylene and intimately mixed therewith, whereby 200 ml. of trichloroethylene containing the aforesaid stabilizing mixture, having a weight of about 295 g., were obtained. This example clearly demonstrates the synergetic character of the mixture. It will be noted that the pH values of the trichloroethylene samples stabilized with individual stabilizers or binary compositions of stabilizers show a noticeable acidity, being considerably below 7.0, while the pH value of the sample stabilized with the ternary mixture of an amine, a phenol, and an alkylenic oxide according to the invention remains, even after the rigid stability tests described above, substantially above 7.0, i.e. in the alkaline range.

*Table I*

| Example No. | Stabilizing products added to trichloroethylene | pH of trichloroethylene after accelerated oxidation test |
| --- | --- | --- |
| (1) | Diisopropylamine, 0.005% | 1.8 |
| (2) | Isopropyl-p-hydroxyanisole, 0.01% | 1.9 |
| (3) | Butylene oxide, 0.21% | 1.8 |
| (4) | Diisopropylamine, 0.005%+isopropyl-p-hydroxyanisole, 0.01%. | 2.4 |
| (5) | Diisopropylamine, 0.005%+butylene oxide, 0.21%. | 2.2 |
| (6) | Butylene oxide, 0.21%+isopropyl-p-hydroxyanisole, 0.1%. | 4.7 |
| (7) | Diisopropylamine, 0.005%+isopropyl-p-hydroxyanisole, 0.01%+butylene oxide 0.21%. | 7.8 |

TEST SERIES II

Table II comprises Examples 8 through 12b where is exhibited the synergism among diisopropylamine, isopropyl-p-hydroxyanisole and propylene oxide.

The results are similar with those of the previous examples.

*Table II*

| Example No. | Stabilizing products added to trichloroethylene | pH of trichloroethylene after accelerated oxidation test |
| --- | --- | --- |
| (8) | Diisopropylamine, 0.005% | 1.8 |
| (9) | Isopropyl-p-hydroxyanisole, 0.01% | 1.9 |
| (10) | Propylene oxide, 0.18% | 1.9 |
| (11) | Diisopropyl-amine, 0.005%+isopropyl-p-hydroxyanisole, 0.01%. | 2.4 |
| (12) | Diisopropylamine, 0.005%+propylene oxide 0.18%. | 2.3 |
| (12a) | Propylene oxide, 0.18%+isopropyl-p-hydroxyanisole, 0.01%. | 5.9 |
| (12b) | Diisopropylamine, 0.005%+isopropyl-p-hydroxyanisole, 0.01%+propylene oxide 0.18%. | 8.8 |

TEST SERIES III

In Table III there are compiled test results on a third test series comprising Examples 13 through 19 and demonstrating in a similar manner as in the preceding test series the synergetic effect of a ternary combination similar to that used in Example 7 but in which ternary mixture, isopropyl-p-hydroxyanisole has been replaced by ethyl-p-hydroxyanisole.

The results of this test series confirm those obtained with the first series and show the decisive synergetic effect exercised by the ternary mixture due to the presence of the p-hydroxyanisole derivative therein.

Table III

| Example No. | Stabilizing products added to trichloroethylene | pH of trichloroethylene after accelerated oxidation test |
|---|---|---|
| (13) | Diisopropylamine, 0.005% | 1.8 |
| (14) | Ethyl-p-hydroxyanisole, 0.01% | 1.8 |
| (15) | Butylene oxide, 0.21% | 1.8 |
| (16) | Diisopropylamine, 0.005%+ethyl-p-hydroxyanisole, 0.01%. | 2.7 |
| (17) | Diisopropylamine, 0.005%+butylene oxide, 0.21%. | 2.2 |
| (18) | Butylene oxide, 0.21%+ethyl-p-hydroxyanisole, 0.01%. | 4.5 |
| (19) | Diisopropylamine, 0.005%+ethyl-p-hydroxyanisole, 0.01%+butylene oxide, 0.21%. | 8.9 |

The above-described examples make evident the technical advantages achieved by using, as a stabilizer for trichloroethylene solvent, a synergetic ternary mixture consisting of an amine, in particular diisopropyl amine; a phenolic compound, specifically a p-hydroxyanisole such as isopropyl-p-hydroxyanisole and ethyl-p-hydroxyanisole; and an alkylenic oxide, specifically propylene oxide and butylene oxide. Due to the use of this synergetic ternary mixture according to the invention, it is possible to use very small amounts only of the amine, thus avoiding an excessively alkaline reaction of the trichloroethylene solvent, whereby the latter is made suitable for degreasing such amphoteric metals as aluminum and zinc.

On the other hand, when used in the synergetic ternary mixture according to our invention, alkylenic oxides can be added to the trichloroethylene degreasing solvent in high enough amounts to exercise in the latter a high acid acceptance.

The phenolic compound and synergism with the amine and the epoxidic compound develops a highly efficient antioxidant action.

It will be understood that while there have been given herein certain specific examples of the practice of this invention, it is not intended thereby to have this invention limited to the specific details of materials, proportions or conditions specified in the examples, in view of the fact that this invention may be modified according to individual preference or conditions without departing from the spirit of this disclosure and the scope of the appended claims.

What we claim is:

1. A method for stabilizing trichloroethylene by inhibiting the acid decomposition thereof when the trichloroethylene is used as a degreasing solvent in processes for degreasing metal surfaces, which method comprises the steps of adding to the trichloroethylene a synergetic ternary mixture comprising of diisopropyl-amine, alkyl-p-hydroxyanisole and a lower alkylene oxide, and intimately mixing said mixture with the trichloroethylene to be stabilized.

2. The method described in claim 1, wherein the lower alkylene oxide is selected from the group consisting of propylene oxide and butylene oxide.

3. A method for stabilizing trichloroethylene by inhibiting the acid decomposition thereof when the trichloroethylene is used as a degreasing solvent in processes for degreasing metal surfaces, which method comprises the steps of adding to the trichloroethylene a synergetic ternary mixture comprising of diisopropyl amine in an amount of from 0.001% to 0.1% by weight, and alkyl-p-hydroxyanisole in an amount of from 0.01% to 0.1% by weight, and an epoxide selected from the group consisting of propylene oxide and butylene oxide, in an amount of from 0.01% to 1.0% by weight, and intimately mixing said mixture with the trichloroethylene to be stabilized.

4. The method as described in claim 3, characterized in that the alkyl-p-hydroxy-anisole is isopropyl-p-hydroxyanisole and that the epoxide is butylene oxide.

5. The method as described in claim 3, characterized in that the alkyl-p-hydroxyanisole is ethyl-p-hydroxyanisole and that the epoxide is butylene oxide.

6. The method as described in claim 3, characterized in that the alkyl-p-hydroxyanisole is isopropyl-p-hydroxyanisole and that the epoxide is propylene oxide.

7. A stabilized trichloroethylene composition substantially free from acid decomposition during use as a degreasing solvent in processes for degreasing metal surfaces, containing intimately admixed therewith a synergetic mixture comprising of diisopropyl-amine, alkyl-p-hydroxyanisole and a lower alkylene oxide.

8. The composition described in claim 7, wherein the alkyl-p-hydroxyanisole is selected from the group consisting of ethyl-p-hydroxyanisole and isopropyl-p-hydroxyanisole.

9. The composition described in claim 7, wherein the lower alkylene oxide is selected from the group consisting of propylene oxide and butylene oxide.

10. A stabilizing composition for the stabilization of trichloroethylene against acid decomposition when the latter is used as a degreasing solvent in processes for degreasing metal surfaces, which stabilizing composition comprises of a synergetic ternary mixture of diisopropylamine, alkyl-p-hydroxyanisole and a lower alkylene oxide.

11. The composition described in claim 10, wherein the alkyl-p-hydroxyanisole is selected from the group consisting of ethyl-p-hydroxyanisole and isopropyl-p-hydroxyanisole.

12. The composition described in claim 10, wherein the lower alkylene oxide is selected from the group consisting of propylene oxide and butylene oxide.

13. A stabilizing composition for the stabilization of trichloroethylene against acid decomposition when the latter is used as a degreasing solvent in processes for degreasing metal surfaces, which comprises a synergetic ternary mixture of diisopropylamine, an alkyl-p-hydroxyanisole selected from the group consisting of ethyl and isopropyl-p-hydroxyanisole, and an epoxide selected from the group consisting of propylene oxide and butylene oxide.

References Cited in the file of this patent

UNITED STATES PATENTS

| 2,751,421 | Stauffer | June 19, 1956 |
| 2,797,250 | Copelin | June 25, 1957 |
| 2,803,676 | Willis | Aug. 20, 1957 |
| 2,818,446 | Starks | Dec. 31, 1957 |

FOREIGN PATENTS

| 787,726 | Great Britain | Dec. 11, 1957 |
| 1,161,469 | France | Sept. 1, 1958 |

UNITED STATES PATENT OFFICE
CERTIFICATE OF CORRECTION

Patent No. 2,981,760                                              April 25, 1961

Antonio Ferri et al.

It is hereby certified that error appears in the above numbered patent requiring correction and that the said Letters Patent should read as corrected below.

Column 4, Table I, second column, line 9 thereof, for "0.1%" read -- 0.01% --.

Signed and sealed this 14th day of May 1963.

(SEAL)
Attest:

ERNEST W. SWIDER                                    DAVID L. LADD
Attesting Officer                                      Commissioner of Patents